No. 738,306. PATENTED SEPT. 8, 1903.
C. T. FINLAYSON.
AERIAL WIRE ROPE TRAMWAY.
APPLICATION FILED DEC. 8, 1902.
NO MODEL. 6 SHEETS—SHEET 1.

Witnesses:
G. Sargent Elliott.
Joseph Wilkinson

Inventor:
By Christopher T. Finlayson
H. S. Bailey. Attorney

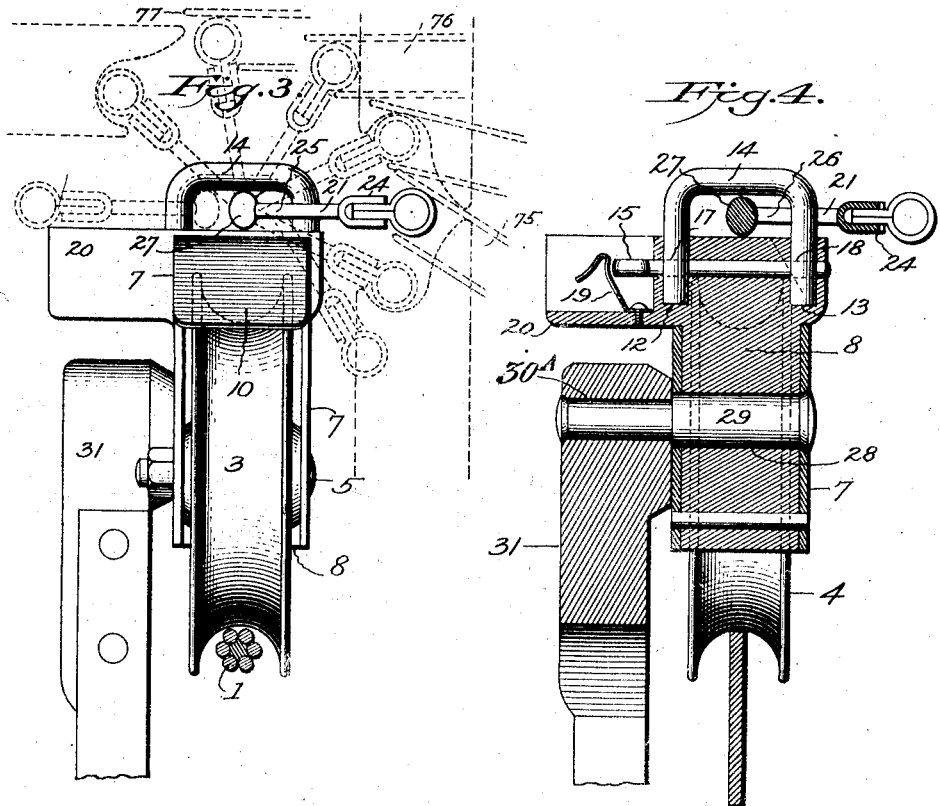
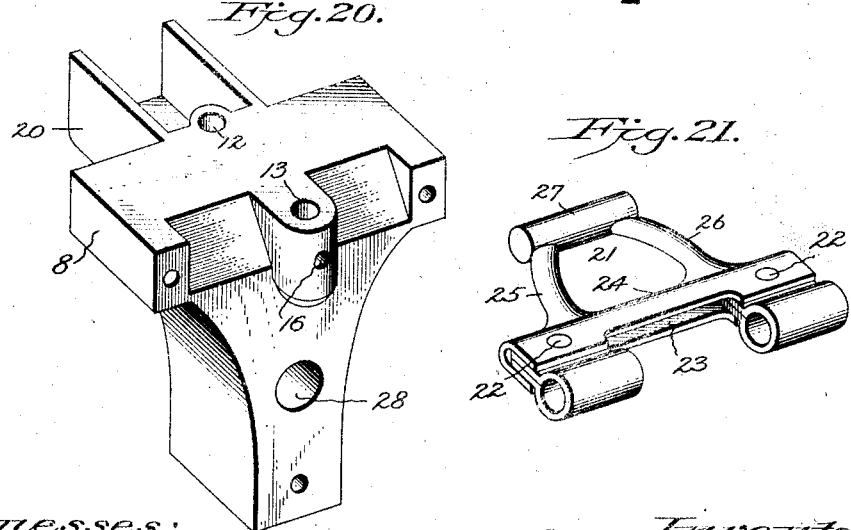

No. 738,306. PATENTED SEPT. 8, 1903.
C. T. FINLAYSON.
AERIAL WIRE ROPE TRAMWAY.
APPLICATION FILED DEC. 8, 1902.
NO MODEL. 6 SHEETS—SHEET 3.
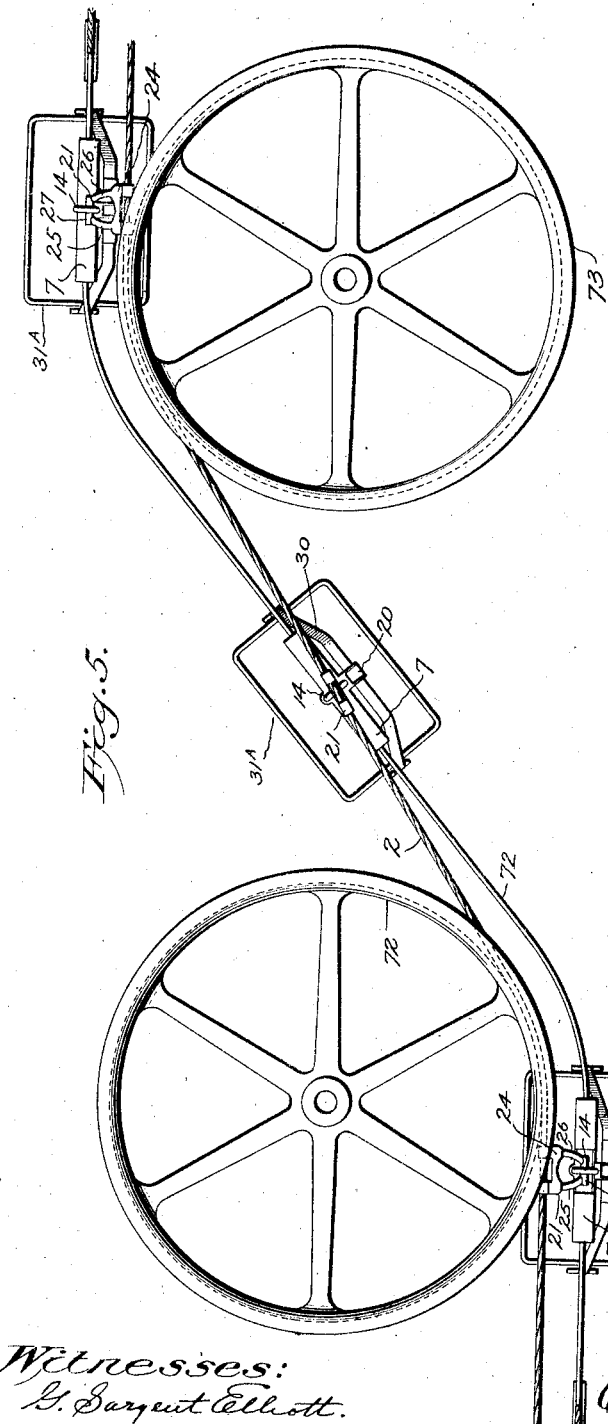
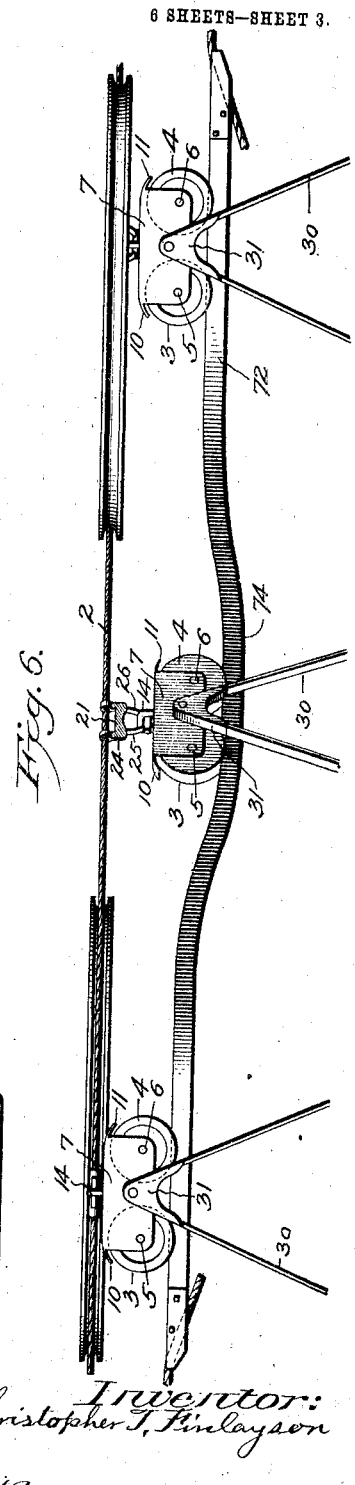
Witnesses:
G. Sargent Elliott.
Joseph Wilkinson
Inventor:
Christopher T. Finlayson
By H. S. Bailey, Attorney.

No. 738,306. PATENTED SEPT. 8, 1903.
C. T. FINLAYSON.
AERIAL WIRE ROPE TRAMWAY.
APPLICATION FILED DEC. 8, 1902.
NO MODEL. 6 SHEETS—SHEET 4.
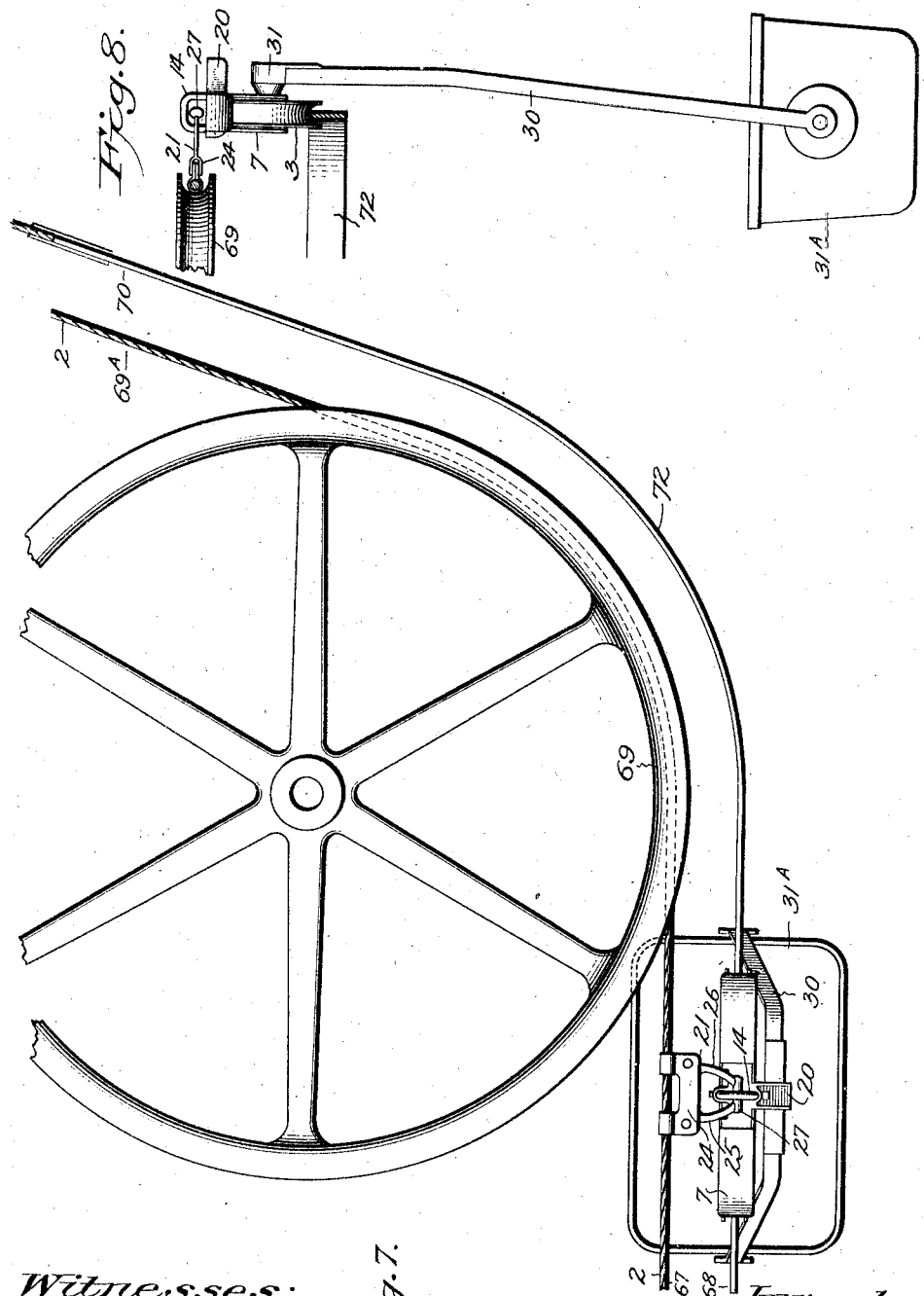

No. 738,306. PATENTED SEPT. 8, 1903.
C. T. FINLAYSON.
AERIAL WIRE ROPE TRAMWAY.
APPLICATION FILED DEC. 8, 1902.
NO MODEL. 6 SHEETS—SHEET 5.

Witnesses:
G. Sargent Elliott.
Joseph Wilkinson

Inventor:
Christopher T. Finlayson
By
H. S. Bailey, Attorney.

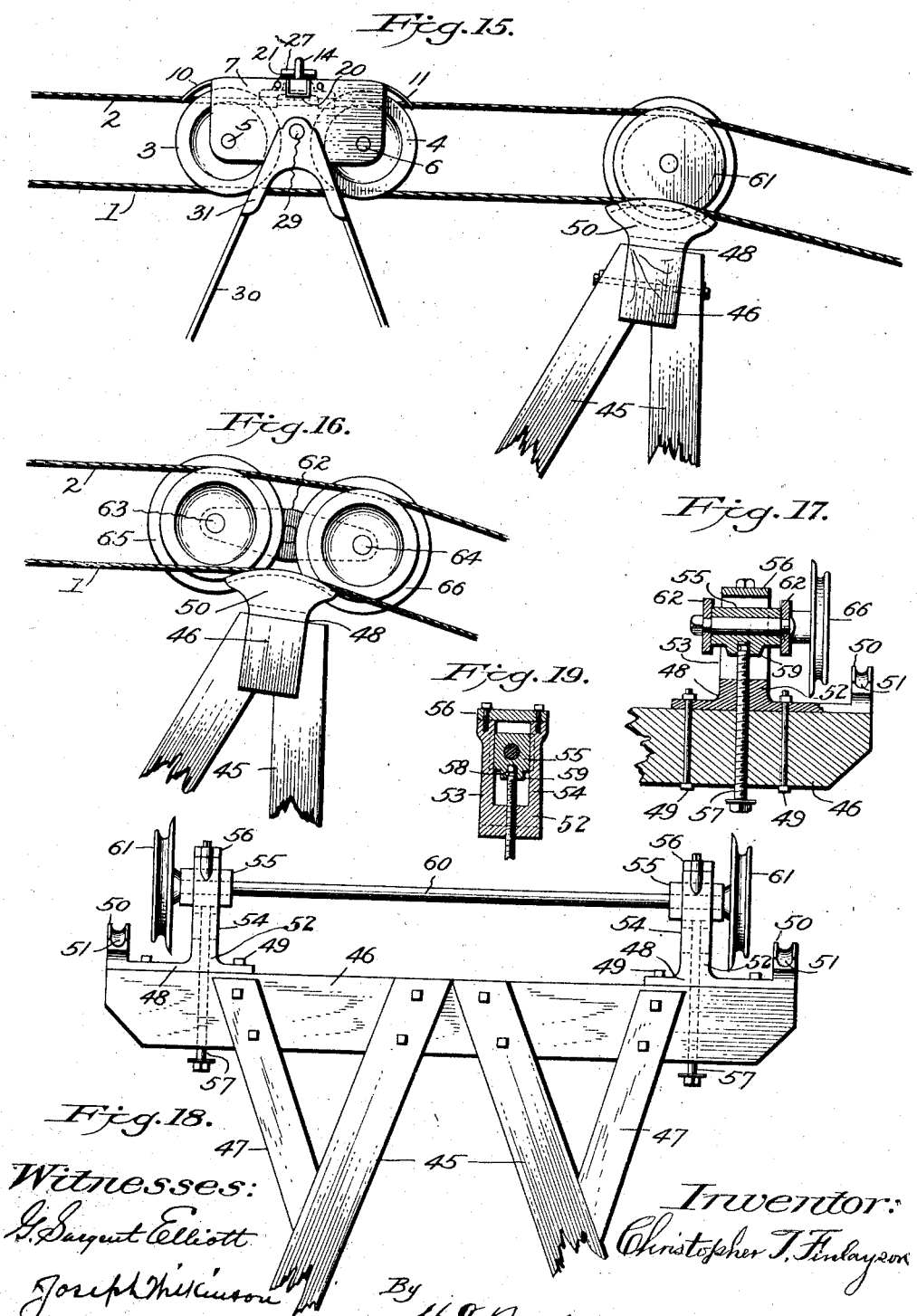

No. 738,306. Patented September 8, 1903.

UNITED STATES PATENT OFFICE.

CHRISTOPHER T. FINLAYSON, OF DENVER, COLORADO.

AERIAL WIRE-ROPE TRAMWAY.

SPECIFICATION forming part of Letters Patent No. 738,306, dated September 8, 1903.

Application filed December 8, 1902. Serial No. 134,420. (No model.)

*To all whom it may concern:*

Be it known that I, CHRISTOPHER T. FINLAYSON, a citizen of the United States of America, residing at Denver, in the county of Denver and State of Colorado, have invented certain new and useful Improvements in Aerial Wire-Rope Tramways; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a new system for aerial wire-rope tramways. In the practical systems at present in use wire-rope tramways are necessarily built in substantially straight lines and the running rope is placed below the stationary rope.

Figure 11:
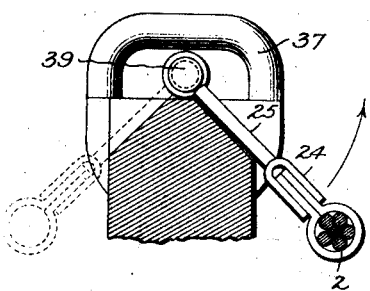

The objects of my invention are, first, to provide a tramway system in which the running rope is placed above the stationary or track rope; second, to provide a tramway system in which straight-inclined or spirally-inclined and reverse curves can be made in a tramway-line; third, to provide a tramway system in which the track-rope or its substitute can be laid in such a manner that the trolleys of the buckets and the buckets can move in an arc of a circle underneath and attached to the running rope, as when the buckets' trolleys are running over reverse curves in the line, as shown in Figures 6 and 7; fourth, to provide a means by which the bucket and rope-connecting clip are connected directly to the bucket-trolley; fifth, to provide means by which the rope-clip has a pivotal lateral swinging connection with the bucket-trolley that permits the clip-rope to move automatically from one side of the trolley through a circular sweep of about two-thirds of a circle, as shown in Figs. 3 and 11; sixth, to provide means for shielding the trolley-wheels from injury from falling material and ice; seventh, to provide means by which the running rope (clip-attached trolley and bucket or carrier) will run under or over a sheave as may be required, making a vertical curve in either direction; eighth, to provide means for adjustably supporting the bearing positions of the running and stationary ropes relative to each other.

I attain these objects by the mechanism illustrated in the accompanying drawings, in which—

Figure 1:
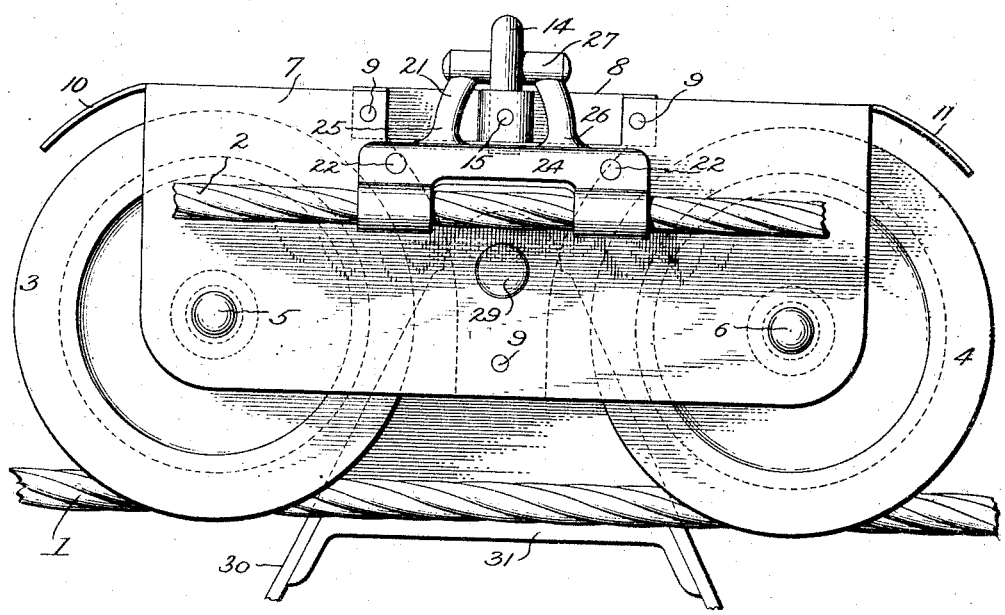
Figure 2:
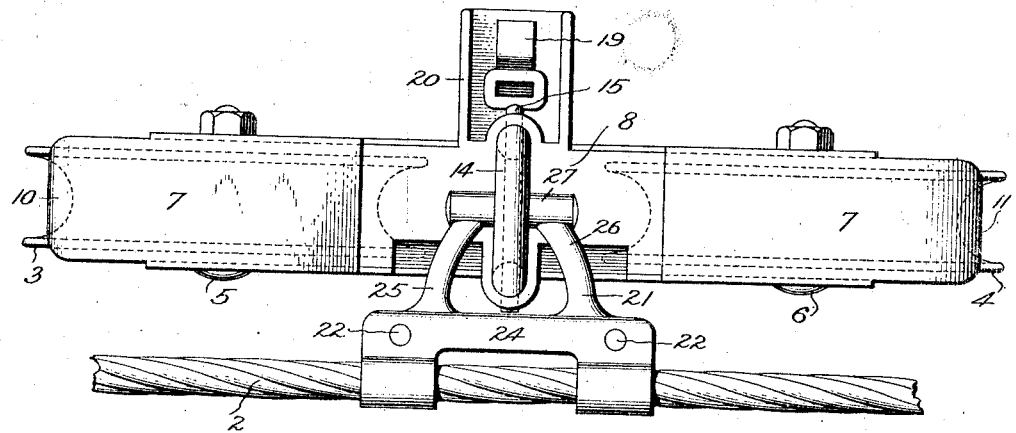
Figure 9:
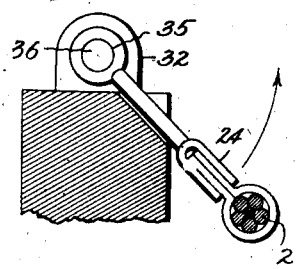
Figure 10:
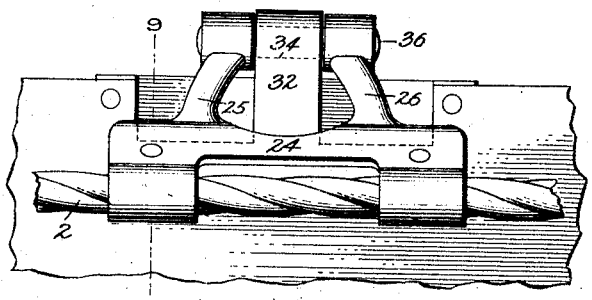
Figure 12:
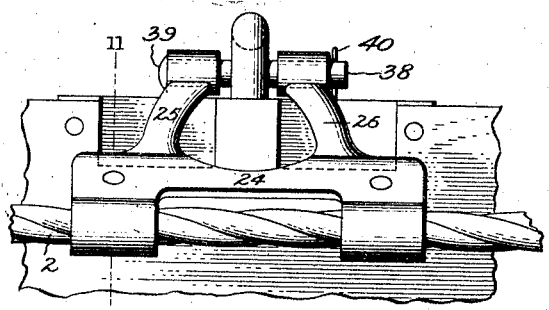
Figure 13:
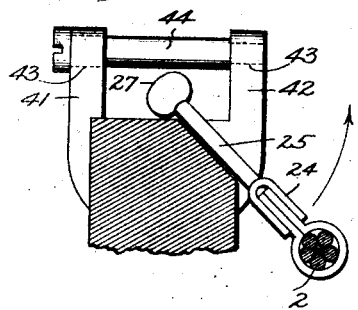
Figure 14:
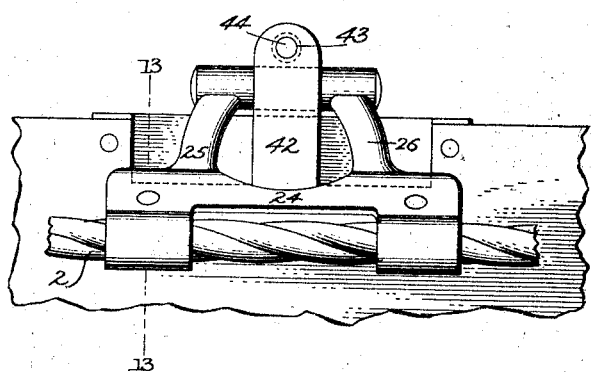

Fig. 1 is a side elevation of my new tramway system. Fig. 2 is a plan view of Fig. 1. Fig. 3 is an end elevation of Figs. 1 and 2. Fig. 4 is a section of Figs. 1 and 2 on line 4 4. Fig. 5 is a plan view of my new system as applied to reverse curves, showing the manner in which the running rope and the trolley-track cross each other. Fig. 6 is a side elevation of Fig. 5. Fig. 7 is a plan view of my system rounding a straight curve. Fig. 8 is an end elevation of Fig. 7, showing but a small fragment of the large sheave-wheel shown in Fig. 7. Fig. 9 is a section of Fig. 10 on line 9 9. Fig. 10 is a fragmentary side elevation of the frame, showing a modification of the manner of pivotally securing the running-rope clip to the bucket-trolley illustrated in Figs. 1, 2, and 3. Fig. 11 is a section of Fig. 12 on line 11 11. Fig. 12 is a fragmentary side elevation of the manner in which I preferably detachably secure the rope-clip with a sliding pivotal connection to the bucket-trolley. Fig. 13 is a section of Fig. 14 on line 13 13. Fig. 14 is a fragmentary side elevation of a modification of the preferred manner in which I detachably secure the rope-clip with a sliding pivotal connection to the bucket-trolley. Fig. 15 is a wide elevation of a fragment of an aerial wire-rope tramway embodying my system and showing a side elevation of a single sheave-wheel-supporting tower for supporting the ropes between the terminals. Fig. 16 is a side elevation of a supporting-tower, showing a double sheave for supporting the running rope arranged to rock or tilt on a pivotal shaft. Fig. 17 is a sectional elevation of Fig. 16. Fig. 18 is a side elevation of a supporting-tower, showing either a fixed, single, or rocking or tilting double-sheave support for the running rope mounted on a single pivotal supporting-shaft, that extends across the tower and arranged to vertically adjust the running rope toward or away from the stationary or track rope, which is supported in a saddle secured to the cap of the tower. Fig. 19 is a sectional elevation of the adjusting device of the tower for adjusting the height of the running rope relative to the track-rope. Fig. 20 is a perspective view of the spreader-block of the trolley, and Fig. 21 is a perspective view of the rope and bucket clip.

Similar characters of reference refer to similar parts throughout the several views.

Referring to the drawings, the numeral 1 designates the stationary rope, and 2 the running rope, of a wire-rope tramway. In my tramway the running rope is placed above the track or stationary rope. The stationary rope is secured to terminals, which consist of structures that form the terminal ends of the tramway-line. These terminals contain a track that connects with the ends of the terminal ropes and extend around the terminal to form an endless track. The running or traction rope, which is an endless rope, passes around a sheave-wheel, usually a grip sheave-wheel, that is rotatably mounted in the terminals.

I do not illustrate the terminals, as my present invention more particularly concerns the character and arrangement of the attachment of the bucket and its trolley to the running rope, which may be applied to most any character of terminal. The trolley of the bucket runs on the stationary or track rope and consists of the sheave-wheels 3 and 4. These are mounted rotatably on shafts 5 and 6, which are supported in a housing or shield 7, that folds over the sheave-wheels. This housing is preferably made of sheet-steel or galvanized iron. A spreader-block 8 is placed between the sides of the housing, the form of which is shown in perspective in Fig. 20. The spreader-block is secured to the housing by rivets 9. At each end of the housing integral portions 10 and 11 extend over the sheave-wheels, forming protecting-shields.

In the top of the spreader of the trolley I form two holes 12 and 13 at opposite sides. I place in these holes the free ends of the yoke-shaped pin 14, which I term the "clip-pin." I arrange this clip-pin to project a short space above the top of the trolley, so as to form a short clear space between it and the top of the trolley. I preferably secure the clip-pin to the holes by means of a pin 15, which I call the "locking-pin," which passes through holes 16, that are formed transversely through the spreader-block and also through holes 17 and 18, formed through the ends of the clip-pin. While the locking-pin may be entered from either side of the trolley, I preferably enter it from the side the bucket hangs from. There are a number of ways in which the locking-pin can be secured in the trolley to prevent its accidental displacement. I preferably use, however, a spring 19 for this purpose and prefer to use a blade or ribbon spring secured at one end to the trolley and arranged to bear with its opposite end against the end of the locking-pin. In order to protect the spring and the projecting end of the locking-pin against knocks, I arrange a housing 20 around them. By withdrawing the locking-pin from the clip-pin and trolley the clip-pin can be raised out of the trolley. I use the clip-pin to detachably secure the rope-clip 21 to the bucket-trolley.

The clip I preferably employ for detachably securing the rope and bucket together comprises two short ribbons of steel, which form the rope-clamps. These ribbon-clamps are preferably spirally fluted interiorly to fit snugly around each strand of the rope. They are preferably folded hot around the rope at a short distance apart, and their free ends are pressed close together and are inserted into and are pivotally secured by a rivet 22 in a recess 23, formed in the edges of a thin bar 24, that forms a part of the body of the clip. From the bar 24 two arms 25 and 26 extend rearward from the rope-clamps from near the opposite ends of the bar, thus forming an open space between them. The arms end in a round cross-bar 27, that forms the free end of the clip. The cross-bar and the arms form a ring or loop, through which the clip-pin is placed when the clip is to be secured to the trolley. The clip-pin is then secured to the trolley by the locking-pin, and the rope and bar are thus secured to the trolley and bucket. The long transverse space across the top of the trolley under the clip-pin gives the rope-clip a sliding self-adjusting pivotal connection to the trolley, which permits the rope and clip to assume any position with a circumferential sweep of about three-quarters of a circle of the radius of the clip from its cross-bar and the clip-pin, the spreading-block and the housing being cut away on the side the running rope is normally positioned relative to the bucket, as shown in Figs. 3, 4, 9, 11, and 13. The pendants extend to and are pivotally secured to the ends of a bucket, as shown in Figs. 5, 7, and 8.

In Figs. 9 and 10 I illustrate a modification of the method of removably securing the clip to the trolley. In this arrangement the spreading-block is provided with an upwardly-projecting lug 32, which is an integral part of it, the center of which is provided with an aperture 34. The central portion of the cross-bar of the clip is cut away, leaving two hub-like ends on the ends of the arms of the clip, through the center of which a pin-hole 35 is formed. The hubs of the clip fit on opposite sides of the lug of the trolley and a pivot-pin 36 is placed through them. In the form of attachment the clip does not have a sliding pivotal support in the trolley, but it has the semicircularly radial swing from one side to the other of the trolley.

In Figs. 11 and 12 I illustrate a second modification of a method of detachably securing the clip to the trolley. In this arrangement I form integral with the spreader-block a projecting substantially rectangular ring or loop portion 37, which forms a long space between the ring and the top of the spreader-block. The clip is formed with hubs on the ends of the arms, as shown and described in connection with the modification shown in Fig. 10. The pivotal pin 38, however, is provided with a head portion 39 and its opposite end projects through the adjacent hub of the clip, and a split pin 40 is inserted through it to prevent its accidental displacement from the hubs and loop. This modification provides a sliding pivotal automatically-adjustable connection between the clip and the trolley throughout about two-thirds of the circumferential swing of a circle of the radius of the clip, similar to the preferred construction shown in Figs. 1 and 2.

In Figs. 13 and 14 I illustrate another method of detachably securing the clip to the trolley. In this method I form two projecting lugs 41 and 42 on opposite sides of the spreader-block, arranging them opposite each other, and through the center of their ends I form a bolt-hole 43. One of these holes is smaller than the other and is threaded, and a screw-bolt 44 is provided with a threaded end and passes freely through the lug having the unthreaded hole and extends across the space between them and threads into the threaded hole of the other. A screw-driver head or any other suitable head is formed on the bolt. The free end of the clip for this arrangement may be either like the arrangement shown in Figs. 1 and 2 or may be like either Figs. 10, 12, or 14.

Both or only one of the opposite sides of the spreader-block and of the housing of the trolley may be cut away, as desired, to allow the rope and clip to move to its lowest practical position, which is as close as it can run without striking against the sides of the trolley, as shown in Figs. 9, 11, and 13. The spreader-block and the shield of the trolley is provided with an aperture 28, in which is revolubly inserted a pin 29, which I term the "pendant-pin," one end of which is upset and sets in a countersunk hole in the adjacent side of the housing. This pin 29 extends beyond the side of the trolley, and its projecting end is preferably reduced in diameter to form a shoulder close to the housing. Upon the projecting end of this pendant-pin I rigidly mount the upper end of the pendant 30 of the buckets, only a fragment of which is shown in Figs. 1, 3, 4, and 6.

The pendant comprises two side bars that converge to a V-shaped casting 31, the center of which is provided with an aperture 30$^A$, which fits tightly over the pin, while the adjacent ends of the pendants are secured to the ends of the V-shaped casting. The outside of the aperture in the casting is countersunk, and the end of the pin is riveted to rigidly secure the pendant on the pin. I preferably employ this method of securing the pendant-pin to the pendant and trolley, as it enables the pin to be very firmly and securely fastened to the pendant and gives a firm pivotal support to the pendant and bucket on the trolley. The free ends of the pendant are pivotally secured to the ends of a bucket 31$^A$.

Between the terminal ends of the tramway the track and running rope are supported by towers, the height of which varies with the profile of the ground over which the tramway runs. These towers are provided with sheave-wheels, which are arranged on opposite ends of the towers to support the opposite lines or the up-and-down sides or lines of the endless running rope, while the track-rope is supported by grooved castings called "saddles," in the grooves of which the track-rope rests. As the track and running rope of my new system are arranged in reverse order from the arrangement of the ropes in the systems at present in use, it is necessary that a tower having saddles and sheaves especially adapted to operatively support the arrangement of ropes of my system be provided and that means be provided for adjustably regulating the relative positions of the track and running rope. I preferably carry out this tower feature of my new system in the following manner.

The tower itself may be constructed of either three or four timbers 45, that extend upright from the ground and converge to and are bolted to a cross-cap 46. Struts 47 extend from the upright timbers to near the ends of the cap. Upon the top of the cap, at its ends, I secure a casting 48 by bolts 49. Upon the end of this casting a saddle 50 is formed. This saddle consists of a thin projecting casting, the upper edge of which is curved and provided with a groove 51. This groove is adapted to receive the track-rope, which rests loosely in the groove. At the opposite end of each cap-casting a standard 52 is formed, which comprises two vertical arms 53 and 54. These arms are arranged to form guideways for a cross-head 55, that is adapted to be reciprocally mounted between them. A cap 56 is bolted to the ends of the arms. A threaded rod 57 extends vertically up through the cap from below it and is threaded to the casting and extends into the lower end of the cross-head a short distance and is secured to the cross-head by a pin 58, that projects through a depending hub portion 59, formed on the cross-head. The pin 58 is arranged to pass through a circumferential groove formed in the end of the threaded rod. The lower end of the threaded rod is provided with a wrench-receiving end, by which it may be turned to raise or lower the cross-head. A shaft 60 is journaled in the cross-heads. I preferably employ a shaft that extends along the cap from one standard to the other that is journaled to and passes through both cross-heads, although, if preferred, a short separate shaft could be secured to each cross-head. Upon the opposite ends of the shaft I support either one or two sheave-wheels, depending upon conditions controlling the tramway. Where I prefer to use one sheave-wheel to support the running rope, I rotatably mount on each end of the shaft a sheave-wheel 61, as shown in Figs. 15 and 18. When, however, I wish to use a double sheave-wheel to support the running rope, I mount loosely on each end of the shaft rock-arms 62, securing them upon the shaft by any suitable means. The opposite ends of each rock-arm are provided with short shafts 63 and 64, that project toward the ends of the cap, and upon these shafts 63 and 64 I rotatably mount sheave-wheels 65 and 66. These sheave-wheels and the rock-arms have a tilting movement. The running rope rests in grooves formed close to the flange of the sheaves, and the sheaves tilt as the clip runs onto them from one side and leaves them on the other.

The vertical sheaves shown on the towers in Figs. 15 and 16 and 18 are used for supporting the ropes on all straight lines; but when curves are to be made the sheaves must be positioned in horizontal and oblique angles, as shown in Figs. 3, 4, 5, 6, 7, and 8. Thus in Figs. 7 and 8 I illustrate a curve starting off from the straight lines 67 and 68 and curving around the sheave 69 and ending in the straight lines 69ᴬ and 70, while in Figs. 5 and 6 I illustrate a reverse curve.

In making curves of any kind I employ a metal rail-track 72, which is set into the rope-trackway by connecting the rope-track to each end of the rail, as shown in Figs. 5, 6, and 7. The metal track, which is preferably a thin wide bar of iron, is bent into the desired curve and is supported in position by any suitable supporting structure or tower. Where a curve is made that turns or starts from the side of the tramway the running rope is on, the running rope and the track are arranged parallel with one another, as shown in Figs. 7 and 8. When, however, a curve turns from the side the track is on, the running rope and the track cross each other, as shown in Figs. 5 and 6.

In making a straight curve, as shown in Figs. 7 and 8, the clip assumes the horizontal position shown in Figs. 7 and 8, as this curve starts from the running-rope side of the tramway-line; but in making a reverse curve, as shown in Figs. 5 and 6, the clip, which is first in the position shown in Fig. 8, is moved by the running rope which crosses the track onto the opposite side of a horizontal sheave 73 from the side of the sheave 72 the curve started from. Consequently the rope-clip, which is in a horizontal position as it strikes the direct straight curve at the sheave 72, must swing to a horizontal position on the opposite side of the trolley in order that the rope may bear on the sheave 73, as the running rope always runs between its sheave-supports and the trolley on a straight portion of the tramway-line.

In order to move the clip to the opposite side of the trolley, I preferably drop the trolley between the sheaves by forming a depending curved portion 74 in the track, as shown in Fig. 6, deep enough to allow the trolley as it runs from the sheave 72 to drop down below the running rope far enough to permit the running rope to swing over and across the trolley. Then the trolley as it runs up the depending curve in the track between the sheaves comes up on the opposite side of the clip before it reaches the sheave 73.

In Fig. 3 the sliding pivotal connection the clip has in the trolley is plainly shown. This sliding movement gives the clip plenty of room in which to adjust itself to lateral irregularities and swaying of the track and running rope between terminals and tower or other supports, and this figure also illustrates the various positions and the full semicircular swing of the clip and running rope around the trolley. As above stated, I preferably provide for this movement of the clip around the trolley by making a depending curve or sag in the track; but the same thing can be accomplished by leading the rope up over the trolley, with sheaves positioned in horizontal and oblique angles to raise it up and guide it over the top of the trolley, as shown by the sheaves 75, 76, and 77, in dotted lines in Fig. 3. It should be remembered the tramway-lines, as a rule, are built down and up steep mountain sides, over gulches and rivers. Consequently curves in the track may be placed in a tramway-line on upward or downward inclines and in all directions regardless of the slope of the mountain. Consequently the curves may be straight or reverse or downward or upward or spiral curves.

This system of aerial wire-rope tramway is very simple to construct. It contains few parts, and it enables straight, reverse, spiral, and inclined curves of all kinds to be made, thus enabling practical wire-rope tramways to be built in places where it would be impossible to build them in straight lines.

Having described my invention, what I claim as new, and desire to secure by Letters Patent, is—

1. In an aerial wire-rope tramway, a track comprising a stationary rope and a track of metal or other suitable material interposed in said rope track, and a traction or running rope placed above said track and arranged and adapted to operate on either side and to cross above it, substantially as described.

2. In an aerial wire-rope tramway, the combination with the track, the trolley and the traction-rope, of a rope and trolley-securing clip, compressing means for securing one end of said clip to said traction-rope, and a loop-shaped pivotal portion at its opposite end, and means for pivotally securing said loop-shaped pivotal portion of said clip to said trolley, substantially as described.

3. In an aerial wire-rope tramway, the combination with the track and track-rope and the traction-rope, of a clip arranged and adapted to be secured at one end to said traction-rope, and having a loop-shaped pivotal end at its opposite end, substantially as described.

4. In an aerial wire-rope tramway, the combination with a trolley-track, a trolley on said track, an endless traction-rope operatively supported to operate above and at either side of said trolley, and means including a clip for detachably securing said traction-rope to said trolley in such a manner that said traction-rope can move above and cross over from one side of said traction to the other, substantially as described.

5. In an aerial wire-rope tramway, the combination with a track, of a trolley mounted on said track, an endless traction-rope operatively supported above said track and arranged and adapted to propel said trolley, a clip secured at one end to said endless running rope, a ring or loop bolt detachably secured to said trolley and arranged and adapted to pivotally secure the opposite end of said clip to said trolley, substantially as described.

6. In an aerial wire-rope tramway, the combination with a track-rope and a metal track forming a continuation of said track-rope, a bucket or load trolley on said track, an endless traction-rope operatively supported above said track and arranged to be guided from one side of said track to its opposite side and arranged and adapted to operate said trolley on said track, a clip secured at one end to said traction-rope and a detachable pivotal connection formed between the opposite end of said clip and said trolley arranged and adapted to permit said clip and said running rope to pivotally swing over said trolley from one side of it to its opposite side, substantially as described.

7. In an aerial wire-rope tramway, the combination with a track-rope and a metal track forming a continuation of said track-rope, a bucket or load trolley on said track, an endless traction-rope operatively supported above said track and arranged to be guided from one side of said track to its opposite side and arranged and adapted to operate said trolley on said track, a clip secured at one end to said traction-rope and a detachable, pivotal, sliding connection formed between the opposite end of said clip and said trolley arranged and adapted to permit said clip and said running rope to pivotally and slidably swing over said trolley from one side of it to its opposite side, substantially as described.

8. In an aerial wire-rope tramway, the combination with the track, of a trolley on the track, an endless traction-rope operatively supported above said track and means including a clip attached at one end to said endless traction-rope and detachably secured at the opposite end by a pivotal connection that will allow said clip and rope to move in a circular path from one side of said trolley to its opposite side, substantially as described.

9. In a wire-rope tramway, the combination with a track, of a trolley on said track, a traction-rope operatively supported above said track, a clip secured at one end to said traction-rope, a yoke-pin secured to said trolley and arranged to form a loop or ring shaped space on the trolley and means for pivotally securing the opposite end of said clip in said loop or ring shaped space of said trolley, substantially as described.

10. In an aerial wire-rope tramway, the combination with the track, of a traction-rope operatively supported above said track, a clip secured at one end to said traction-rope, a loop-shaped pivotal end at the opposite end of said clip, a releasable loop or ring arranged on said trolley, and means for pivotally connecting the loop-shaped pivot end of said clip to said releasable loop or ring, substantially as described.

11. In an aerial wire-rope tramway, the combination with a rope or other suitable track, of a traction-rope operatively supported adjacent to said rope, a clip secured at one end to said traction-rope, a pivotal end on the opposite end of said clip, a loop or staple-bolt arranged to be inserted in said trolley and arranged to pivotally connect the pivotal end of said clip to said trolley and arranged in such a manner that said clip and traction-rope swing from one side of said trolley over to the opposite side of said trolley, and means including a pin for detachably securing said loop or staple-bolt to said trolley, substantially as described.

12. In an aerial wire-rope tramway, the combination with the track, of a traction-rope operatively supported above the said track, the clip secured at one end to the said rope, and supported with a pivotal end at its opposite end, a loop or staple-bolt extending loosely into said trolley and arranged to pivotally connect the pivotal end of said clip to said trolley, holes extending through said trolley and the ends of said loop or staple-bolt, a locking-pin extending into said holes in said trolley and staple clip-pin, and means for securing said pin against accidental displacement from said trolley, substantially as described.

13. In an aerial wire-rope tramway, the combination of the track-rope and track, the traction-rope operatively supported above said track, the clip secured to said traction-rope, the clip-pin arranged to pivotally secure the free end of said clip to said trolley, and the spring-controlled pin arranged to detachably lock said clip-pin to said trolley, substantially as described.

14. In an aerial wire-rope tramway, the combination with the rope and metal track, of a traction-rope arranged parallel with said track and operatively supported above said track, a bucket or load-supporting trolley mounted on said track comprising a supporting-housing, a pair of sheave-wheels operatively mounted in said housing and mounted on said track, a pendant pivotally attached to said trolley, a bucket pivotally secured to said pendant and a clip secured at one end to said traction-rope and arranged and adapted to have an automatic, sliding, pivotal connection with the top of said trolley that will permit said clip and traction-rope to swing from one side over to the opposite side of said trolley and thus cross and recross said track, substantially as described.

15. In an aerial wire-rope tramway, the combination with the track, of a trolley mounted on said track, comprising a pair of sheave-wheels, a suitable housing, inclosing a spreader-block secured in said housing between said sheave-wheels, and shafts secured in said housing and arranged to rotatably support said sheave-wheels, substantially as described.

16. In an aerial wire-rope tramway, the combination of a track, a trolley mounted on said track comprising a suitable supporting-housing, a spreader-block in said housing, shafts secured in the ends of said housing, sheaves rotatably mounted on said shafts and adapted to run on said track, a shaft pivotally secured to said housing and spreader-block and projecting beyond it on one side, a bucket or load supporting pendant, secured at one end to said trolley-shaft and at its opposite end to a bucket, or load-supporting device, substantially as described.

17. In an aerial wire-rope tramway, the combination with a track, of a trolley mounted on said track comprising a suitable housing, a pair of sheaves rotatably mounted in said housing, a bucket and pendant pivotally secured to said trolley, an endless traction-rope operatively supported above said track; a clip secured at one end to said traction-rope, a pivotal head or trunnion or hub portion at the free end of said clip and a loop or ring shaped staple clip-pin in the top of the housing of said trolley arranged to pivotally attach and release the free end of said clip at the will of an operator to said housing of said trolley, substantially as described.

18. In an aerial wire-rope tramway, the combination with the track, the trolley, the pendant pivotally secured to said trolley and the bucket pivotally secured to said pendant, of a staple or yoke shaped clip-pin removably secured in the top of said trolley and a spring-controlled pin arranged to lock said clip-pin to said trolley, substantially as described.

19. In an aerial wire-rope tramway, the combination with the track, of a trolley mounted on said track, two vertical apertures in the top of said trolley, a yoke or staple shaped pin extending loosely into said apertures, transverse apertures through the ends of said clip-pin, a transverse aperture through said trolley registering with the apertures in said clip-pin, a locking-pin provided with an enlarged head end portion extending loosely through the apertures in said trolley and clip-pin, a spring secured at one end to said trolley and arranged to bear resiliently at its opposite end on the enlarged end of said locking-pin, and a casing or housing projecting from said trolley and arranged to shield said spring, substantially as described.

20. In an aerial wire-rope tramway, the combination with the track, of a trolley comprising a suitable supporting frame or housing, sheave-wheels pivotally mounted therein, a spreader-block in said housing between said sheave-wheels, vertical holes in the top of said spreader-block, a yoke-shaped clip-pin arranged to extend loosely into said holes and to stand above the top surface of said spreader-block and housing far enough to form an elongated or substantially rectangular slot or aperture between the said yoke-pin and the top of said spreader-block, means including a spring-controlled pin for releasably securing said yoke-pin to said spreader-block, a traction-rope arranged above said track, a clip secured at one end to said rope having a pivotally-arranged terminal portion at the free end of said clip arranged and adapted to be used slidably and pivotally, and to be releasably secured to the yoke-pin of said trolley, whereby said traction-rope is operatively held automatically on either side of said track, and the traction-rope can move automatically across said track from one side to the other as conditions require it, substantially as described.

21. In an aerial wire-rope tramway, the combination of the track and the traction-rope with a trolley on said track, a bucket and pendant pivotally supported at one side of said trolley and a clip pivotally secured in the central portion of said trolley to pivotally swing and slide transversely across the top of said trolley, whereby said traction-rope has a radial circular swing of about three-quarters of a circle over the top of and about the opposite sides of said trolley and track, substantially as described.

22. In an aerial wire-rope tramway, the combination of a stationary track-rope, and a suitable track of metal or other suitable material interposed in said stationary track-rope intermediate of its terminal ends, substantially as described.

23. In an aerial wire-rope tramway, the combination of stationary, flexible track-ropes provided with curved fixed or rigid tracks of metal or other suitable material inserted in them and connected to them, intermediate of their ends, a trolley arranged on said tracks, a traction-rope operatively supported above said stationary tracks, and means including a clip for connecting said traction-rope to said trolley, substantially as described.

24. In an aerial wire-rope tramway the stationary rope-tracks having a track of metal or other suitable material bent in reverse curves and interposed in the length of said stationary rope-tracks, substantially as described.

25. In an aerial wire-rope tramway, the combination of stationary, flexible tracks having rigid curved tracks inserted in them between their terminal ends, and a supporting-sheave arranged above said tracks, and a traction-rope arranged above said tracks and arranged to curve around said sheave parallel to said rigid curved track, substantially as described.

26. In an aerial wire-rope tramway, the combination of a flexible track having reversed curved rigid tracks inserted in it intermediate of its terminal ends, a traction-rope operatively supported above said flexible track, a horizontally or obliquely supported sheave-wheel at the opposite sides of said reverse-curve track at the beginning and ending of said reverse curve, a trolley on said track, a clip arranged to pivotally secure said traction-rope to said trolley, and a depending curve or sag in said reverse-curved track between said traction-rope, supporting-sheaves arranged and adapted to permit said traction-rope to cross said reverse-curved track and said trolley, substantially as described.

27. In an aerial wire-rope tramway, the combination of wire-rope tracks having reversed curved rigid tracks of metal or other suitable material inserted in them and forming the trolley-track where curves are necessary in a tramway-line and having said reverse-curved tracks provided with a depending sag or curve intermediate of their ends, substantially as described.

28. In an aerial wire-rope tramway, the combination of two ropes, one a track-rope, the other an endless traction-rope, said ropes being provided with suitable operative tramway terminal ends, said ropes being supported intermediate of their terminal ends by suitable tower-supports having said track-rope provided at points where curves in said tramway-line are necessary with rigid metal curved tracks and having said endless traction-rope operatively supported above said track-rope throughout the tramway-line and parallel with it by vertically or obliquely supported sheave-wheels, and at the points where curves occur, by horizontal or obliquely-supported sheave-wheels, a trolley and bucket operatively supported on said tracks, a clip arranged to pivotally secure said traction-rope to said trolley, and means including sheave-wheels for automatically changing the position of said traction-rope from one side of said trolley and track to the other, substantially as described.

29. In an aerial wire-rope tramway, the combination in a curved tramway-line, of a track-rope, a traction-rope operatively supported above said track-line by vertically-supported sheaves, a rigid metal track at the curves in said curved tramway-line, a horizontally-supported sheave arranged to support the traction-rope at said curve, a trolley on said track, a bucket supported by said trolley, a clip arranged and adapted to pivotally secure said traction-rope to said trolley and means including a spirally-curved sag in said rigid metal track for said swinging traction-rope to either side of said trolley-track, substantially as described.

30. In an aerial wire-rope tramway, the combination with a tramway-line provided with suitable terminals, of a track-rope, a traction-rope operatively supported above said track-rope, suitable towers intermediate of said terminals and provided with a transverse cap-beam, a casting at each end of said cap-beam, a grooved projection on said casting adapted to form a saddle for said track-rope, a projecting standard on said casting, a sliding block on said standard, a shaft projecting from said sliding block, a sheave-wheel rotatably mounted on said shaft and adapted to support said traction-rope, including a threaded rod for raising and lowering said sheave in said standard whereby the relative positions of the traction and track ropes may be varied, substantially as described.

31. In an aerial wire-rope tramway, the combination of a tramway having a track-rope and a traction-rope operatively supported above said track-rope, suitable terminals for said track and traction ropes, suitable towers intermediate of said terminals comprising a plurality of uprights of any suitable material, a cap member secured at the top of said uprights transversely to the run of the tramway, a casting secured to each end of said cap, a saddle adapted to support said track-rope on each end of said casting, a standard on each casting, a slideway in each standard, a crosshead in each slideway of each standard, a shaft mounted in said cross-heads and extending from one to the other and beyond them, a sheave-wheel rotatably mounted on each end of said shaft and adapted to support said traction-rope and means including threaded rods arranged and adapted to raise said cross-heads and shaft and sheaves whereby said traction-rope may be raised and lowered, substantially as described.

32. In an aerial wire-rope tramway, the combination of a track-rope and a traction-rope operatively supported above said track-rope, suitable terminals for said ropes, a suitable tower for supporting said ropes between said terminals having a rocking and vertically-adjustable support for said traction-rope comprising a casting secured at each end of said tower, a saddle adapted to support said stationary rope on said casting, a standard on said casting, a slideway in said standard, a shaft projecting from each side of said crosshead, rock-arms pivotally mounted on each end of said shaft, a shaft projecting laterally from the ends of said rock-arms, a sheave adapted to support said traction-rope rotatably mounted on said shafts, and means including a threaded rod arranged in said standard and casting for raising and lowering said cross-head rock-arm and sheaves, substantially as described.

33. In an aerial wire-rope tramway, the combination of the track-rope and the traction-rope with a rocking and vertically-adjustable sheave-tower support for said traction-rope, comprising a casting secured to a suitable tower, a suitable support for said track-rope or said casting, a standard on said casting, a cross-head slidably supported on said standard, rock-arms pivotally connected to said cross-head a sheave adapted to support said traction-rope rotatably mounted at each end of said rock-arms and means including a threaded rod connected to said cross-head for adjustably raising or lowering said sheaves, substantially as described.

34. In an aerial wire-rope tramway, the combination with the track-rope, the trolley and the traction-rope operatively supported above the said trolley, with a clip, comprising rope-clamping bands of thin ribbon steel folded around said rope, at a short distance apart, a bar containing in its edge a slot in which said rope-clamping bands are pivoted, arms extending rearward from the opposite side of said bar from said rope-clamping bands and an integral round bar or pivotal hub portion formed at the ends of said arms substantially parallel with said bar, substantially as described.

In testimony whereof I affix my signature in presence of two witnesses.

CHRISTOPHER T. FINLAYSON.

Witnesses:
G. SARGENT ELLIOTT,
JOSEPH WILKINSON.